United States Patent [19]

Anderman et al.

[11] Patent Number: 4,731,310
[45] Date of Patent: Mar. 15, 1988

[54] CATHODIC ELECTRODE

[75] Inventors: Menahem Anderman, Boyds; Joseph T. Lundquist, Jr., Jessup, both of Md.

[73] Assignee: W. R. Grace & Co., New York, N.Y.

[21] Appl. No.: 896,690

[22] Filed: Aug. 15, 1986

[51] Int. Cl.$^4$ .............................................. H01M 4/36
[52] U.S. Cl. .................................. 429/194; 429/212; 429/217
[58] Field of Search ...................... 429/217, 212, 194

[56] References Cited

U.S. PATENT DOCUMENTS

| | | | |
|---|---|---|---|
| 2,677,713 | 5/1954 | Weil et al. | 429/217 |
| 3,060,254 | 8/1959 | Urry | 429/217 |
| 3,099,586 | 9/1960 | Duddy | 429/218 |
| 3,184,339 | 4/1962 | Ellis | 264/104 |
| 3,351,495 | 11/1967 | Larsen et al. | 429/252 |
| 3,898,099 | 8/1975 | Baker et al. | 136/75 |
| 3,918,989 | 11/1975 | Gillman et al. | 429/215 |
| 4,091,176 | 5/1978 | Alfenaar | 429/40 |
| 4,124,747 | 11/1978 | Murer et al. | 429/210 |
| 4,169,816 | 10/1979 | Tsien | 252/511 |
| 4,223,080 | 9/1980 | Auborn | 429/194 |
| 4,320,185 | 3/1982 | Bernstein et al. | 429/217 |
| 4,322,317 | 3/1982 | Rao et al. | 429/212 |
| 4,550,064 | 10/1985 | Yen et al. | 429/94 |
| 4,562,113 | 12/1985 | Yonahara et al. | 429/210 |
| 4,601,919 | 7/1986 | Asami et al. | 429/217 |
| 4,654,281 | 3/1987 | Anderman et al. | 429/212 |

OTHER PUBLICATIONS

NASA Technical Brief, vol. 9, No. 2, Item 103, (Summer, 1985).
Electrochemica Acta, vol. 29, No. 11, pp. 1589–1596, (1984).
J. Electrochem Soc., pp. 656–660, (May, 1974).
J. Electrochem Soc., pp. 1107–1109, (May, 1983).

Primary Examiner—John F. Niebling
Assistant Examiner—Steven P. Marquis
Attorney, Agent, or Firm—Howard J. Troffkin

[57] ABSTRACT

A polymer bonded sheet product suitable for use as a cathodic electrode in a non-aqueous battery system wherein the cathodic electrode is a microporous sheet composed of from 6-10 weight percent polyethylene having a molecular weight of 200,000 to 500,000, 90-94 weight percent of titanium disulfide particulate material and from 0 to 2 weight percent of a plasticizer for the polyethylene; the sheet having a void volume of from 15 to 25 percent.

16 Claims, No Drawings

CATHODIC ELECTRODE

BACKGROUND OF THE INVENTION

The present invention is directed to a highly filled $TiS_2$- polymer bonded electrodes useful in a non-aqueous battery and to a battery system containing said electrodes.

Storage batteries have a configuration composed of at least one pair of electrodes of opposite polarity and, generally, a series of adjacent electrodes of alternating polarity. The current flow between electrodes is maintained by an electrolyte composition capable of carrying ions across electrode pairs.

Non-aqueous batteries have certain distinct advantages over other types of storage batteries. They use, as anodes, light weight metals, such as lithium, lithium-aluminum alloys and the like which are at the far end of the electromotive series. These batteries have the potential for providing much higher gravimetric and volumetric energy densities (capacity per unit weight and volume, respectively) than other types of batteries, due to the low atomic weight of the metal and high potential for forming a battery in conjunction with suitable positive electrodes far removed from the light weight metal (alkali metal) electrode (the description herein will use batteries having lithium as the light weight metal anode although other light weight metals can be used) in the electromotive series. The battery can be formed in any conventional physical design, such cylindrical, rectangular or disc-shaped "button" cells, normally of a closed cell configuration.

The battery components of positive electrode, negative electrode and separator can be in the form of distinct alternating plates in a sandwich design or of a continuous spirally wound design as are well known. The anodic electrodes can be formed, for example, from lithium metal or its alloys on a support, such as a nickel coated screen. The electrolyte can be formed of a non-aqueous solvent of fused or solid electrolyte. Illustrative of known useful non-aqueous solvents include acetonitrile, tetrahydrofuran and its derivatives, propylene carbonate, various sulfones and mixtures of these solvents containing a light metal salt such as lithium salts as, for example, lithium perchlorate, iodide or hexafluroarsenate and the like. An additional, normally passive component of the battery is a separator membrane located between plates of opposite polarity to prevent contact between such plates while permitting electrolytic conduction. Separators are normally of the form of sheets which possess very low electronic conductivity.

Significant developments have been made in the fabrication of non-aqueous batteries. However, one of the major concerns is the lack of development of a suitable cathdoe in which the electrochemically cathodic material is present in the form of a porous, flexible, sheet material. The cathodic active material must be bonded into a unitary sheet by a material which is inert with respect to the other components of the battery as well as being inert and compatable to the active material. The bonding material must be capable of readily forming a uniform sheet in which the active material is uniformly distributed throughout the length and breadth of the sheet as well as across its thickness to provide maximum effectiveness. The bonding material must be kept to very low amounts of the total sheet material or the cathodic active material will be encompassed by the material and thereby dramatically reduce the conductivity and activity of the resultant cathodic sheet product. Even though present in only small amounts the bonding polymer must be capable of maintaining the sheet integrity and provide resistance to fractures, spalling and disintegration attributable to the expansion and contraction forces encountered in charge-discharge cycling when used in a secondary battery system.

Polymer bonded electrodes presently known have a number of deficiencies which has limited their utility and, thereby limited the acceptance of an effective non-aqueous battery system. The presently known polymer-bonded electrodes are not capable of being mass produced by a reliable, cost-effective, non-aqueous process. In addition, the majority of known polymer-bonded electrodes exhibit flaking and disintegration when the formed sheet is further processed such as when applied to a current collector and/or during assembly into a battery.

A number of bonding polymers have been considered for and used in the fabrication of cathodic polymer bonded electrodes. The most widely used material at the present time is poly(tetrafluoroethylene), commonly referred to as PTFE or by the tradename Teflon. PTFE bonded electrodes have certain drawbacks which limit their usefulness and ability to provide a highly effective product. For example, the chemical inertness of this polymer causes the fabrication of electrodes to be both difficult and laborious. Generally, it requires initially mixing the active material with an aqueous slurry of PTFE which is then doctored onto a surface and heated to high temperatures (250°–400° C.) to remove the water and cause bonding. The presence of water and the processing at high temperatures limits the active materials which can be used in forming the electrode product. For example, titanium disulfide, a desirable active material, is known to be unstable in the presence of water. PTFE bonded sheets tend to flake and are not free standing unless large amounts of polymer are used. The sheets are conventionally bonded to a current collector screen by pressing them together at high temperatures. This process normally produces a brittle product which tends to crack and chip. Finally, a major defect of this known class of product is its non-uniformity both in distribution of active material and of porosity. This defect is inherently due to the processing techniques required, especially the evaporation of solvent from the materials causing non-uniformity across its thickness as well as from point-to-point on the sheet product. Patents illustrating formation of polymer bonded electrodes by this technology are U.S. Pat. Nos. 3,457,113; 3,407,096; and 3,306,779.

Some work has been done to form a product from dry tetrafluoroethylene suspensions to overcome the incompatibility problems associated with water but such products require sintering at very high temperatures (e.g. 400° C.) which also limits the types of active fillers which can be used. Patents illustrating this known technology are U.S. Pat. Nos. 3,184,339 and 3,536,537.

More recently polymer bonded electrodes have been formed from slurries of EPDM (ethylene-propylene-diene terpolymer) in an organic medium, such as cyclohexane (see "Elastomic Binders for Electrodes" by S.P.S. Yen et al., J. Electrochem. Soc., Vol. 130, No. 5, Pg. 1107). Other elastomeric polymers, such as sulfonated ionomers, butyl rubbers and the like have also been used in forming electrodes by a slurry technique (See U.S. Pat. No. 4,322,317). The resultant electrode products formed in this manner exhibit greater elasticity and compatability with the other battery components. However, the defects of non-uniformity of product, poor control of porosity and pore size distribution remain a problem. In addition, electrodes made by this method exhibit severe loss of activity after being subjected to only a few charge-discharge cycles as noted by the low figure of merit reported in U.S. Pat. No. 4,322,317.

It is highly desired to be able to provide a polymer bonded electrode which exhibits high charge density; which is capable of sustaining high discharge rates; and which is capable of exhibiting very low capacity loss upon charge-discharge cycling. In addition, the elctrode should be capable of being easily fabricated, exhibiting a high degree of uniformity, being flexible material which can be readily formed into desired configuration and maintaining its integrity under the conditions encountered in a battery (including expansion-contraction of cycling). Finally, it is highly desired to provide a polymer-bonded electrode which is in the form of a sheet of controlled microporosity capable of permitting entry and mobility of electrolyte therein which can thereby increase the electrode's activity.

Upon initial consideration, it might be assumed that many binding materials could be used as alternatives to the small number of materials presently used and obtain the desired results. However, although there are a large number of polymers available as binders in many applications including as electrode binders, a selection of a specific binder is not obvious to the artisan when attempting to provide a $TiS_2$ filled cathodic electrode because of the many factors which influence the results one obtains with any particular binder. Among the major factors which influences the results obtained are: (1) the solubility of the binder in the organic electrolytes which are required in this application; (2) the chemical stability of the polymer at the electrode potential realizing that many cells are operated at different potentials; (3) the stability of the electrochemically active and electrically conductive materials used in combination with a particular binder and under the conditions needed for fabrication; (4) the ability of the polymer to bind the titanium disulfide and other particulate material into a unitary structure at very low concentrations in order to provide a cathodic electrode with good performance; (5) the ability and ease of obtaining a uniform distribution of the binder with the active material of the electrode; (6) the ability of the polymer to maintain a stable cathodic electrode capable of undergoing a multiplicity of charge-discharge cycling; (7) the number and ease of the steps required to obtain the desired cathodic electrode; and (8) the safety, availability of material and cost. Thus, selection of a polymer for use in forming a high performance electrode which contains titanium disulfide has been a difficult task because of the above factors which impose severe restrictions and limitations.

In a copending U.S. Application Ser. No. 843,347 filed Mar. 24, 1986, applicants disclosed a polymer bonded $TiS_2$ electrode which preferably contained ultrafine conductive carbon particulate to enhance the electrical conductivity of the resultant sheet. However, the use of such high surface area conductive carbon reduces the charge density of the electrode and thus reduces the capacity of the battery system. In addition, in some instances the presence of carbon may cause electrolyte decomposition which shortens the life of the battery. The presently described sheet product provides a cathode having high electrical conductivity and electrochemical activity without the difficulties associated with the addition of conductive diluents such as carbon.

It has now been discovered that a cathodic polymer bonded electrode suitable for use in non-aqueous batteries can be readily formed in a manner which provides a superior electrode and overcomes the processing problems associated with Teflon and other presently used polymers as described above and can exhibit the highly desired features of having high charge density, being capable of sustaining high discharge rates and having very low capacity loss upon charge-discharge cycling.

SUMMARY OF THE INVENTION

The present invention is directed to a $TiS_2$ polymer bonded electrode and to a non-aqueous battery system containing said electrode product in which the electrode is a thin, microporous sheet composed of from 6–10 weight percent polyethylene of a weight average molecular weight of from 200,000 to 500,000, 90–94 weight percent of titanium disulfide and from 0–2 weight percent of an organic plasticizer for the polyethylene. The sheet is prepared by initially forming a substantially uniform mixture of the components with excess plasticizer, shaping the mixture into a sheet, extracting a portion of the plasticizer, compressing the sheet and then extracting the remainder of the plasticizer. The resultant product is a flexible sheet material which possesses a high degree of mechanical integrity, strength and uniformity, has a controlled pore volume of from 15 to 25 percent with pore size of narrow distribution and exhibits high conductivity of at least 0.15 reciprocal ohm-cm and preferably at least 0.3 reciprocal ohm-cm.

The polymer bonded electrode product formed according to the present invention is capable of exibiting very low loss of capacity even after subjection to a large number of charge-discharge cycles.

DETAILED DESCRIPTION OF THE INVENTION

The polymer bonded electrode product of the present invention is in the form of a thin sheet which is required to be formed from a homogeneous admixture of polyethylene, a plasticizer for the polyethylene, and titanium disulfide. The electrode is not required to contain additional electrically conductive materials (such as carbon) to provide an electrode of high capacity.

The polymer electrode product of the instant invention is formed through a series of precursor materials. Generally, a uniform admixture is initially formed of polymer, plasticizer and titanium disulfide. The admixture is capable of exhibiting sufficient flow and rheological characteristics to permit the admixture to be readily processed and shaped at relatively low temperatures (i.e. 25° C.–170° C). An initial sheet is formed from the admixture. The plasticizer component is then partially removed from the initial sheet. The initial sheet is then processed to provide an intermediate sheet having a portion of the original plasticizer content therein. The intermediate sheet is compressed prior to final removal of the remaining plasticizer to provide a resultant sheet having the desired void volume and $TiS_2$ content. The plasticizer removal normally occurs subsequent to the forming of a laminate in which a metal screen (a current collector) is laminated to a sheet or sandwiched between two sheets to provide an electrode product. The final product, having had the plasticizer component substantially removed, is composed of from 6 to 10 weight percent of polyethylene and of from 90 to 94 weight percent $TiS_2$. The resultant product has a void volume of from 15–25 percent and is useful as a polymer bonded electrode.

The present invention requires the utilization of polyethylene of high density. The polyethylene should have a weight average molecular weight of 200,000 to 500,000. Although homopolymers are preferred the term "polyethylene", as used herein and in the appended claims, shall mean polyethylene homopolymers and copolymers in which copolymer is formed from olefinic monomers such as ethylene, propylene, butene-1, acrylate and the like with the major (preferably at least 80 percent) olefinic monomer being ethylene.

The plasticizer of the instant composition must be present in the initial formulating and processing to form an initial sheet product, as more fully described below. The plasticizer provides the means of fabricating the composition to a uniform consistency and to aid in inducing and controlling the degree of porosity, the pore size distribution and uniformity of porosity throughout the resultant sheet product.

Plasticizers suitable for the instant invention are compounds which are capable of plasticizing polyethylene, are substantially inert with respect to titanium disulfide and are substantially soluble in an organic solvent which is a non-solvent with respect to the polymer component described above and the titanium disulfide. Representatives of such plasticizers are organic esters, such as sebacates, phthalates, stearates, adipates and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; coumarone-indene resins and terpene resins; tall oil and linseed oil. The preferred plasticizers are hydrocarbon materials and most preferred plasticizers are selected from petroleum oils. The plasticizer is generally substantially free of water (anhydrous) and, therefore, compatable with the subject battery system.

The organic plasticizer used herein aids in fabricating the sheet product and in imparting microporosity to the resultant sheet. The void volume of the resultant sheet will be directly dependent upon the amount of plasticizer contained in the intermediate sheet prior to subjecting the sheet to compression and to the amount of plasticizer extracted therefrom to provide the final sheet product. Void volumes of the final sheet product may range from 15 to 25 volume percent with from about 15 to 22 volume percent being preferred. Electrodes with higher ranges of void volume have been found to exhibit much higher capacity loss. The sheets void volume is of a microporous character which generally have narrow pore size distribution and are of low mean diameter (i.e. 0.01 to 0.5 microns) and can be determined by standard mercury intrusion techniques.

The particulate material required in forming the present admixture and the resultant sheet is composed of the cathodic electrochemically active and electrically conductive titanium disulfide. The term "electrochemically active" refers herein and in the appended claims to the ability of the titanium disulfide to enter and participate in a redox reaction with an alkali metal during the operation and in the environment of an electrochemical cell. The term "electrically conductive" refers herein and in the appended claims to the ability of titanium disulfide to exhibit low resistance to the passage of electrons. The particulate material required in the present invention, titanium disulfide, when used in the present sheet product configuration is capable of exhibiting high electrochemical activity and electrical conductivity.

The titanium disulfide must be in particular form. The mean particle size of the material should be 30 microns or less and preferably 15 microns or less. Smaller particle size material is preferred to enhance intimate contact between the particles of electrochemically active material contained in the resultant electrode. It has been unexpectedly found that by using titanium disulfide and polyethylene in the amounts and of the type described hereinabove in an electrode having the particular void volume of from 15 to 25 volume percent one obtains an electrode which can sustain its capacity over a large number of charge-discharge cycling.

In addition to the above described components, the initially formed admixture may further contain conventional stabilizers, antioxidants, wetting agents, processing aids or mixtures thereof. Representative of stabilizers are 4,4-thiobis(6-tertbutyl-m-cresol) sold commercially under the tradename "Santonok" and 2,6-ditertbutyl-4-methylphenol sold commercially under the tradename "Ionol". Examples of known commercially available wetting agents include sodium alkyl benzene sulfonate, sodium lauryl sulfate, dioctyl sodium sulfosuccinate, and isooctyl phenyl polyethoxy ethanal. Processing aids include stearates, graphite and the like.

The above-described components can be readily formed into a substantially homogeneous admixture. The initial admixture should be formed by blending from about 3 to 30 (preferably 12 to 20)) volume percent polymer, from about 27 to 76 (preferably 40 to 55) volume percent of $TiS_2$ and from about 20 to 70 volume percent of polymeric plasticizer.

The blending of the components can be readily accomplished by conventional means such as by initially mixing at room temperature in a blender and then in a Banbury, Brabender or sigma blade mixer or the like at moderate (about 25° to about 170° C., preferably from about 120° to about 160° C.) temperatures. The blending and processing can be done under dry conditions to avoid water pick-up by the materials.

It has been found that extremely high particulate content admixtures required by the present invention exhibit rheological properties which permit them to be readily shaped and formed into thin sheet products of less than about 50 mils and preferably less than about 20 mils. It must be understood that the particular thickness can be customized by the artisan based on the battery design and its acceptable drain rate. Sheet products and electrodes therefrom can be made of less than 5 mils thickness. Sheet products made by presently known conventional techniques can not be formed of such thin dimensions and maintain good mechanical properties as is attainable by the sheet products of the present invention. The term "sheet" as used herein and in the appended claims refers to a shaped product having extensive length and breath dimensions and of thin cross-section and which may have major surfaces which are substantially flat or of a predetermined design. The initial sheet product can be readily formed from the admixture by subjecting the admixture to extrusion, calendering, injection molding or compression molding processing. All of these processing means are capable of producing the initial sheet in large volume using low labor involvement. The most preferred method is extrusion of the admixture using a conventional extrusion apparatus to continuously provide initial sheet product.

The forming of the initial sheet (a sheet having high levels of plasticizer therein) can be readily accomplished at moderate operating conditions, including low temperatures of from about 25° to 175° C. and preferably from about 120° to 160° C. Such temperatures allow formation of sheet product using components normally deemed unsuitable under known slurry processes. Further the present process provides a sheet which is a free-standing and has substantial uniform distribution of particulate material throughout its length and breadth dimensions as well as across its cross-sectional dimension.

The initially formed sheet can be formed into a final sheet product suitable for use as a cathode through the formation and processing of an intermediate sheet product. The formed initial sheet, as described hereinabove contains a very high percentage of plasticizer. Removal of substantially all of the plasticizer would provide a sheet product highly loaded with $TiS_2$ and having a large void volume. It has been found that such sheet products do not exhibit the ability to sustain its capacity over a large number of charge-discharge cycling. However, when the final sheet is formed as described herein, one achieves the desired product. Such a final sheet can be achieved by processing an initially formed sheet into an intermediate sheet having from about 10 to 22 volume percent plasticizer therein. Such an intermediate sheet can be formed by a variety of manners such as by (a) removing a portion of the plasticizer contained in the initial sheet to reduce the plasticizer content to between 10 and 22 volume percent; (b) removing substantially all of the plasticizer contained in the initial sheet and then causing a fixed amount of plasticizer to be absorbed into the sheet to provide an intermediate sheet having plasticizer content of from 10 to 22 volume percent; or (c) forming the initial sheet from mixtures of a first and a second plasticizer which have mutually exclusive solubility in two solvents useful for extraction, removing the first plasticizer such as by extraction or the like with a solvent which is a substantial non-solvent for the second plasticizer therein to thus provide an intermediate sheet having from 10 to 22 volume percent of the second plasticizer. The intermediate sheet is then compressed such as by passing the sheet through nip rollers or the like to cause the sheet to be substantially nonporous. The compressed intermediate sheet is then subjected to extraction or the like to remove substantially all of the plasticizer contained in the intermediate sheet to provide a resultant sheet product having 6 to 10 weight percent polyethylene, 90 to 94 weight percent $TiS_2$ and from 0 to 2 weight percent plasticizer as described hereinabove.

The formed sheet, either as the initial, intermediate or final sheet, can be readily made into a suitable cathodic electrode by laminating a conventional current collector with at least one sheet of the present invention. The plasticizer component can be extracted, as described below, prior or subsequent to lamination with the current collector. It is preferred to form the laminate structure of at least one sheet with a suitable current collector prior to extraction of all of the plasticizer material. One preferred mode is to form the laminate structure during the compression of the intermediate sheet, as discussed above.

The current collector is normally a screen, grid expanded metal, woven or non-woven fabric or the like formed from efficient electron conductive materials such as carbon, or metals such as copper, aluminum, nickel, steel, lead, iron or the like. The current collector, when laminated to the final sheet product (a sheet substantially comprising particulate material bonded by very low amounts of polyethlyene) of the present invention, provides a low electronic resistance path between the active material and the battery terminal.

The sheet product, with or without the presence of plasticizer, is a pliable and moldable material which can be readily laminated to the collector screen by concurrently passing a screen and at least one sheet through a set of nip rollers or the like to press (under low pressure and preferably at moderate temperatures of about 25° to 170° C.) to produce a laminate product. It is preferred that the laminate be of a configuration of a screen sandwiched between (and thereby embedded in) two sheets although a laminate of a single sheet and single screen may be desired in certain applications. The laminate can be most readily formed by utilizing an initial sheet product immediately after its production to utilize the sheet in its elevated temperature state.

The plasticizer contained in the initial formed sheet should be substantially completely removed by means of extraction using suitable solvent. The composition of the resultant electrode will depend upon the degree of extraction of the plasticizer. The plasticizer can be substantially completely removed, leaving a microporous polymeric sheet product which is highly filled with titanium disulfide. The resultant sheet product exhibits good physical properties and a high degree of microporosity. The microporosity character of the resultant polymer bonded electrode provides a means to permit the electrolyte to be in intimate contact with a very high percentage of the titanium disulfide particulate material. It is believed, although not meant to be a limitation on the present invention, that the microporous structure of the sheet permits the particles residing in the interior of the sheet to be more active.

The procedure for extraction of the plasticizer from a sheet product is well known and is not meant to form a part of the present invention, per se. The solvent or extraction conditions should be chosen so that the polyolefin and particulate material are essentially insoluble. For example, when petroleum oil is to be extracted from the formed sheet, the following solvents are suitable; chlorinated hydrocarbons, such as trichloroethylene, tetrachloroethylene, carbon tetrachloride, methylene chloride, tetrachloroethane, etc., as well as hydrocarbon solvents such as hexane, benzene, petroleum ether, toluene, cyclohexane, gasoline, etc. Aqueous solutions should not be used as these would react and decompose the particulate material used in the instant electrode product.

The extraction temperature can range anywhere from room temperature up to the melting point of the polyolefin as long as the polyolefin does not dissolve. The temperature can be maintained such that all components remain stable and are not adversely effected.

The time of the extraction will vary depending upon the temperature used and the nature of the plasticizer being extracted. For example, when a higher temperature is used, the extraction time for an oil of low viscosity can be a very short time of up to only a few minutes, whereas if the extraction is performed at room temperature, the time requirement will be greater.

The final composition of the polymer-bonded electrode sheet product will depend upon the original composition and the degree of extraction of the plasticizer from the sheet product. The final extracted sheet must have a composition comprising from 6 to 10 weight percent polyethylene, about 90 to 94 weight percent titanium disulfide, and from about 0 to 2 weight percent plasticizer. The more preferred electrode comprise a mixture of from 7 to 9 weight percent polyolefin, 91 to 93 weight percent titanium disulfide, and from 0 to 1 weight percent plasticizer.

The electrical conductivity of the resultant sheet products were measured with a Yellow Spring Instrument Conductivity Bridge at 1 KHz placing a nickel metal clamp on each of the two opposite ends of the specimen to be tested in such a manner as to have a free sample spacing of 1 cm by 1 cm not covered by the clamps. The thickness of the samples were measured. The clamps were connected to the conductivity bridge and the resistance of the samples were measured. To check the accuracy of the measurements, the clamps were adjusted to a spacing of 2 cm by 1 cm and the resistance remeasured.

The porosity volume percents or void volume percent were calculated for the resultant sheet product by calculating the wet weight minus dry weight divided by the sheet product's geometric wet volume.

Charge-Discharge cycling was performed on cells having the subject sheet using a Princeton Applied Research Model 363 galvanostat. The galvanostat was powered and monitored with an Analog Devices μMAC 5000 microcomputer which controlled the current passing through the cell and measured the current passing through the cell and measured the current voltage and charge throughout the cycle.

The following examples are given for illustrative purposes only and are not meant to be a limitation on the subject invention, except as made in the claims appended hereto. All parts and percentages are by weight unless otherwise indicated.

EXAMPLE I (a) 8 parts of a high density polyethylene having a weight average molecular weight of 250,000 were mixed with 21 parts of hydrocarbon oil (Sunthene 255: density of 0.89 g/ml, 54 ssu at 210° F., flash point of 390° F.) and 84 parts of a commerically available battery grade titanium disulfide having an average particle size of 10 microns. The mixture was compounded in a Brabender maintained at 150° C. for two 10 minute periods. The resultant homogeneous mixture was pressed into flat sheets using a flat plate press (Wabash) maintained at 150° C. at a pressure of 400 psi to obtain sheets of 14.5 mils. thickness.

(b) An expanded Ni screen (5 mils. thick) having a nickel tab attached to one end was placed adjacent to a sheet formed in the manner described in paragraph (a) above. The composite was pressed using a flat plate press (Wabash) maintained at 150° C. and 500 psi pressure. The pressed product was observed to be a unitary structure having the screen embedded within. The pressed sheet was then immersed in cyclohexane bath for 15 minutes and then vacuum dried. The porosity of the sheet was about 40 percent. This sheet was then immersed in a 38 vol. percent solution of hydrocarbon oil (Sunthene 255) in cyclohexane to have a fixed amount of oil absorbed by the sheet. The sheet was removed from the solution and dried to permit the cyclohexane to evaporate. The electrode was pressed once more to remove the voids, then the oil was removed by extraction as described above and finally dried.

The resultant electrode was composed of 8.7 weight percent polyethylene and 91.3 weight percent titanium disulfide having a pore volume of 20 vol. percent.

EXAMPLE II

The electrode of Example I above was placed in an Argon atmosphere glove box and used to fabricate a spirally-wound Li-TiS$_2$ battery cell. The cell was formed from lithium foil, commercial microporous polypropylene separator, the electrode of Example I and 5 mil of electrolyte solution composed of 1.5 M LiAsF$_6$ in 2-methyl tetrahydrofuran.

The solid components of the cell will fit into a standard AA size cell with the electrolyte being in excess. The cell was sealed in glass tubing, evacuated and then filled with the electrolyte solution through a Ni tube which was subsequently sealed. The cell contained 1.14 Ah of TiS$_2$ and 1.80 Ah of Li.

The cell was discharged to 1.6 volts and charged to 2.6 volts. The cell delivered 0.96 Ah (84% of theoretical) (1 mA/cm$^2$) at 190 mA in cycle No. 7 and 0.68 Ah (63% of theoretical) at the same rate at cycle No. 71.

EXAMPLE III

Sheets were formed in the same manner as described in Example I above except that 8 parts of polyethylene were mixed with 19 parts of hydrocarbon oil and 89 parts of TiS$_2$. Two sheets were positioned on each side of a nickel expanded screen and pressed into a unitary sheet and then subjected to two fresh baths of cyclohexane to extract substantially all of the oil. The electrode sheet was then immersed in a 38 vol. percent solution of hydrocarbon oil (Sunthene 255) in cyclohexane to allow sufficient oil pick-up to form the desired product void volume. The sheet was dried and pressed to remove excess voids as described in Example I above and then the oil contained in the sheet is removed by extraction with final drying.

A small rectangular glass sealed cell was built using the above electrode with lithium foil and an electrolyte solution composed of 1.2 M LiAsF$_6$ in 2-methyl tetrahydrofuran. The cell was discharged to 1.6 V and charged to 2.6 V. The utilization of the TiS$_2$ electrode (% of theoretical) was 90 percent for cycle No. 3 (1 mA/cm$^2$); 81 percent for cycle No. 28 (1.5 mA/cm$^2$) and 75% for cycle No. 65 (1.5 mA/cm$^2$). The charge density of this electrode was 0.9 mAh/cm$^2$-mil. The fade rate was very low.

EXAMPLE IV

The following Examples are made for comparative purposes:

1. A sheet product was formed in the same manner as described in Example III above except that only the initial extraction step was performed. The resultant electrode sheet was composed of 8.3 weight percent polyethylene and 91.7 weight percent TiS$_2$ and had a void volume of 36 percent.

The electrode sheet was used as the cathode component of a rectangular cell fabricated in the same manner as described in Example III. The charge density of the TiS$_2$ electrode was about 0.7 mAh/cm$^2$-mil. The cell was discharged (at 1 mA/cm$^2$) to 1.6 volts and charged to 2.6 volts. The cell delivered 92 percent of capacity at cycle No. 2 but only 60 percent of capacity at cycle No. 45. The observed large cell capacity fade was due to deterioration of the TiS$_2$ cathode as the lithium and electrolyte were present in excess.

2. 4 parts of polyethylene having a weight average molecular weight of $5 \times 10^6$ were mixed with 20 parts of hydrocarbon oil (Sunthene 255) and 105 parts of commercially available battery grade TiS$_2$ having an average particle size of 10 microns. The mixture was processed into an electrode in the same manner as described in Example I above. The resultant electrode was used to form a Li-TiS$_2$ rectangular cell as described in Example III above.

The cell was discharged at 1 mA/cm$^2$ to 1.6 volts and charged at 0.35 mA/cm$^2$ to 2.6 volts. The TiS$_2$ capacity utilization was 95% for cycle No. 2; 71% at cycle No. 10; and 60% at cycle No. 18. The large capacity fade was due to TiS$_2$ electrode deterioration as lithium and electrolyte were in excess.

We claim:

1. A cathodic electrode suitable for use in a non-aqueous battery system comprising at least one substantially homogeneous, microporous sheet product having a void volume of from 15 to 25 volume percent and having a composition consisting essentially of from about 90–94 weight percent of particulate material consisting essentially of titanium disulfide having an average particle size of less than about 20 microns, from about 6–10 weight percent of high density polyethylene having a weight average molecular weight of from about 200,000 to 500,000 and from 0 to about 2 weight percent of an organic plasticizer for said polyethylene; and a current collector composed of a conductive material, said collector being in intimate contact with each of said at least one microporous sheet product.

2. The electrode of claim 1 wherein the current collector is in the form of a screen, grid, expanded metal, foil or woven or non-woven fabric formed from carbon or a conductive metal.

3. The electrode of claim 1 wherein the polyethylene has a weight average molecular weight of from about 200,000 to about 300,000, the void volume is from 15 to 22 volume percent, the polymer is present in 7 to 9 weight percent; the titanium disulfide is present in from 91 to 93 weight percent; and the plasticizer is present in 0–1 weight percent.

4. The electrode of claim 2 wherein the polyethylene has a weight average molecular weight of from about 200,000 to about 300,000.

5. The electrode of claim 1 composed of two sheet products and having the current collector therebetween; said sheet products forming a substantially unitary structure of total thickness of less than about 50 mils.

6. The electrode of claim 2 composed of two sheet products and having the current collector therebetween; said sheet products forming a substantially unitary structure of total thickness of less than about 50 mils.

7. The electrode of claim 3 composed of two sheet products and having the current collector therebetween; said sheet products forming a substantially unitary structure of total thickness of less than about 50 mils.

8. The electrode of claim 4 composed of two sheet products and having the current collector therebetween; said sheet products forming a substantially unitary structure of total thickness of less than about 50 mils.

9. In a secondary non-aqueous battery comprising at least one pair of electrodes composed of anodic electrode and a cathodic electrode and a non-aqueous electrolyte composition, said anodic electrode formed from an alkali metal, wherein the improvement comprises having the cathodic electrode consist essentially of the product of claim 1.

10. In a secondary non-aqueous battery comprising at least one pair of electrodes composed of anodic electrode and a cathodic electrode and a non-aqueous electrolyte composition, said anodic electrode formed from an alkali metal, wherein the improvement comprises having the cathodic electrode consist essentially of the product of claim 2.

11. In a secondary non-aqueous battery comprising at least one pair of electrodes composed of anodic electrode and a cathodic electrode and a non-aqueous electrolyte composition, said anodic electrode formed from an alkali metal, wherein the improvement comprises having the cathodic electrode consist essentially of the product of claim 3.

12. In a secondary non-aqueous battery comprising at least one pair of electrodes composed of anodic electrode and a cathodic electrode and a non-aqueous electrolyte composition, said anodic electrode formed from an alkali metal, wherein the improvement comprises having the cathodic electrode consist essentially of the product of claim 4.

13. In a secondary non-aqueous battery comprising at least one pair of electrodes composed of anodic electrode and a cathodic electrode ad a non-aqueous electrolyte composition, said anodic electrode formed from an alkali metal, wherein the improvement comprises having the cathodic electrode consist essentially of the product of claim 5.

14. In a secondary non-aqueous battery comprising at least one pair of electrodes composed of anodic electrode and a cathodic electrode and a non-aqueous electrolyte composition, said anodic electrode formed from an alkali metal, wherein the improvement comprises having the cathodic electrode consist essentially of the product of claim 6.

15. In a secondary non-aqueous battery comprising at least one pair of electrodes composed of anodic electrode and a cathodic electrode and a non-aqueous electrolyte composition, said anodic electrode formed from an alkali metal, wherein the improvement comprises having the cathodic electrode consist essentially of the product of claim 7.

16. In a secondary non-aqueous battery comprising at least one pair of electrodes composed of anodic electrode and a cathodic electrode and a non-aqueous electrolyte composition, said anodic electrode formed from an alkali metal, wherein the improvement comprises having the cathodic electrode consist essentially of the product of claim 8.

* * * * *